2 Sheets. Sheet 1.

W. E. Crandall,

Hobby Horse.

No. 3972. Reissued May 17, 1870.

Witnesses.

Joshua Monroe

W. H. Trickel

Inventor.

W. E. Crandall.

by John A. Wiedersheim

Atty.

2 Sheets, Sheet 2.

W. E. Crandall,

Hobby Horse.

No. 3972. Reissued May 17, 1870.

Witnesses.
Joshua Monroe
W. H. Finckel.

Inventor.
W. E. Crandall
by John Wisdom Atty

United States Patent Office.

WILLIAM E. CRANDALL, OF NEW YORK, N. Y.

*Letters Patent No.* 100,121, *dated February* 22, 1870; *reissue No.* 3,972, *dated May* 17, 1870.

IMPROVEMENT IN CHILDREN'S CARRIAGES.

The Schedule referred to in these Letters Patent and making part of the same.

*To all whom it may concern:*

Be it known that I, WILLIAM E. CRANDALL, of the city, county, and State of New York, have invented a new and useful Improvement in Children's Carriages and Rocking-Horses; and I do hereby declare the following to be a clear and exact description of the nature thereof, sufficient to enable others skilled in the art to which my invention appertains to fully understand and use the same, reference being had to the accompanying drawings making part of this specification, in which—

Similar letters of reference indicate corresponding parts in the several figures.

Figure 1:
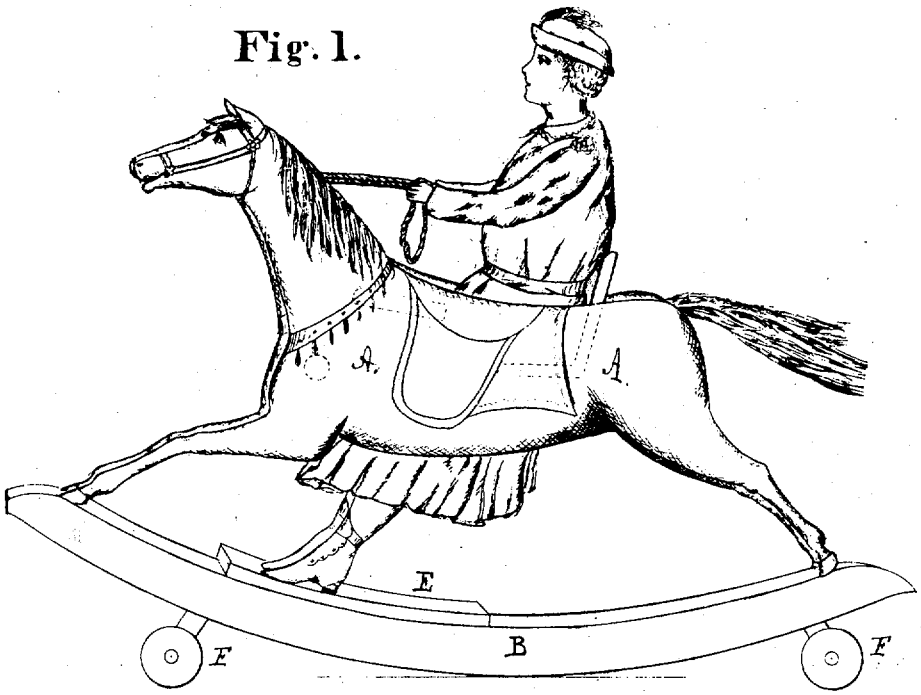
Figure 1 is a side view of the device illustrating my invention.
Figure 2:
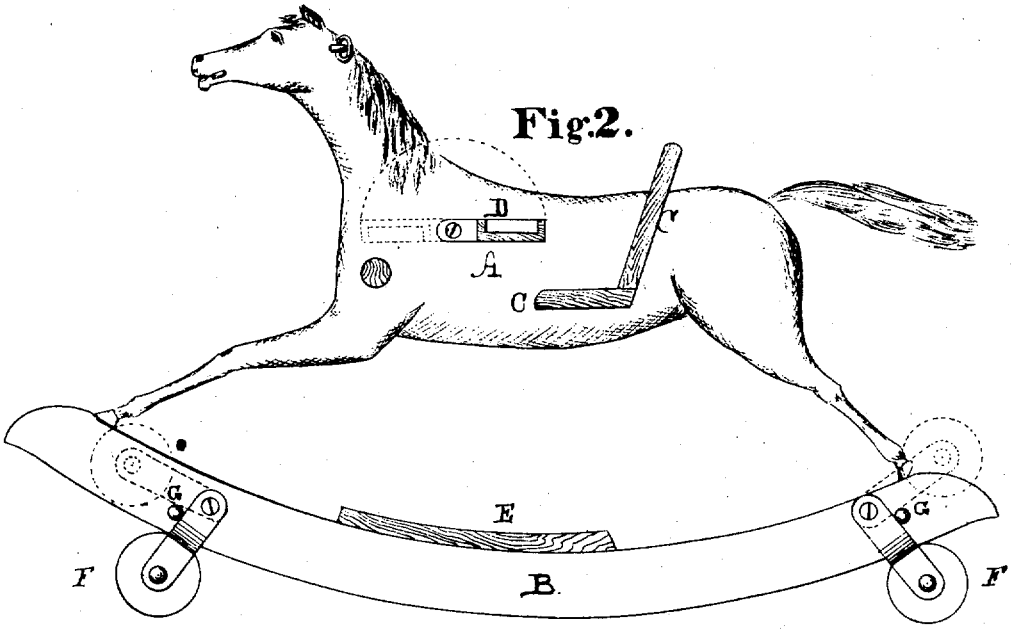
Figure 2 is a central vertical longitudinal section thereof.
Figure 3:
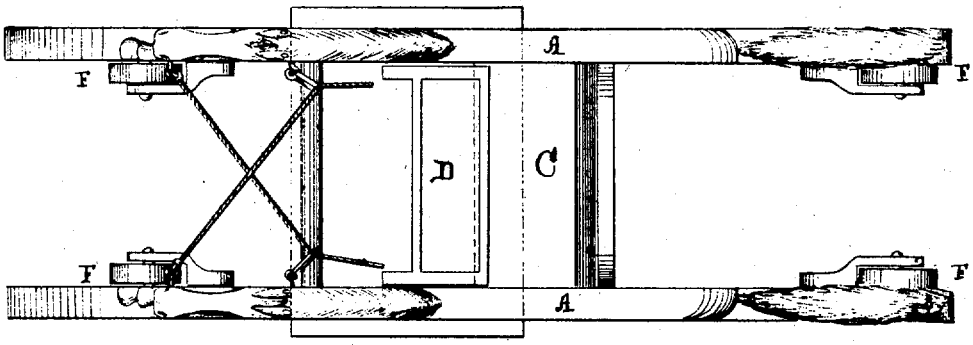
Figure 3 is a top or plan view.

My invention consists in constructing the body of a child's carriage of two frames, and a seat which connects them, so that the child's feet may project below the seat, and thus form a safe riding device.

It also consists in a toy-box hinged in front of the seat.

The body may be mounted on wheels or rockers, and thus form a carriage or rocking-horse, at the pleasure of the child.

In the drawings—

A A may represent two frames, which in the present case are made in the form of horses, which are arranged parallel to each other, with their feet resting on a base, B, which, if desired, may be in the form of rockers of an ordinary rocking-horse.

The frames are connected together by cross-pieces, forming a seat, C, which may be located between or on top of said frames.

A box, D, may be hinged in front of the seat, serving to hold the child in place, and forming a receptacle for playthings.

The base B and frames, respectively, may be connected together by auxiliary cross-rods, bars, or braces, or otherwise, for strengthening purposes, and the child may rest his feet on a foot-board, E, which is secured to the base B.

To the base B there may be connected, in any suitable manner, a series of wheels, F, whose bearings should be so constructed that the wheels may be swung or raised up or down, whereby the whole weight may rest either on the wheels or on the bed.

When it is desired to employ the device as a carriage, the wheels are swung or moved downward, and, by means of suitable pins G or other retaining devices, the bed is cleared from the floor, and the carriage can then be drawn forward as an ordinary child's carriage.

When the wheels are raised or removed, then the bed should consist of rockers, so that the child can rock himself, after the manner of a rocking-horse.

Should the arms or shafts of the wheels be immovable fixtures, the bed E may consist of a flat board or strip, and not be in the form of rockers.

The frames A A and their connecting seat form an attractive and amusing riding mechanism, and present the appearance of two animals, which the child can drive simultaneously without straddling, and thus without danger of falling out.

Suitable harness may be placed on the horses, and the bridle extend within convenient reach of the child.

Having thus described my invention,

What I claim as new, and desire to secure by Letters Patent, is—

1. A riding device, consisting of frames A A, connected together by a seat, so as to allow the feet of the rider to extend downwardly between the frames, substantially as and for the purpose described.

2. The combination of the box D, frames A, and seat C, substantially as and for the purpose described.

3. The wheels F, in combination with the frames A and seat C, substantially as and for the purpose described.

4. The frames A, seat C, box D, bed B, and wheels G, combined and operating substantially as described.

5. The rockers B, in combination with the frames A and seat C, substantially as described.

To the above I have signed my name this 30th day of April, 1870.

WM. E. CRANDALL.

Witnesses:
J. P. STANBERY,
JOHN E. COUTANT.